(12) United States Patent
Dupaquis et al.

(10) Patent No.: US 7,392,276 B2
(45) Date of Patent: Jun. 24, 2008

(54) EFFICIENT MULTIPLICATION SEQUENCE FOR LARGE INTEGER OPERANDS WIDER THAN THE MULTIPLIER HARDWARE

(75) Inventors: Vincent Dupaquis, Peypin (FR); Laurent Paris, Rousset (FR)

(73) Assignee: Atmel Corporation, San Jose, CA (US)

( * ) Notice: Subject to any disclaimer, the term of this patent is extended or adjusted under 35 U.S.C. 154(b) by 687 days.

(21) Appl. No.: 10/615,475

(22) Filed: Jul. 7, 2003

(65) Prior Publication Data
US 2004/0199562 A1 Oct. 7, 2004

(30) Foreign Application Priority Data
Apr. 7, 2003 (FR) .................................. 03 04299

(51) Int. Cl.
*G06F 7/52* (2006.01)
(52) U.S. Cl. ....................................... 708/625
(58) Field of Classification Search ................. 708/620, 708/625
See application file for complete search history.

(56) References Cited

U.S. PATENT DOCUMENTS

| | | | |
|---|---|---|---|
| 4,240,144 A | 12/1980 | Kindell et al. | 364/200 |
| 4,754,421 A | 6/1988 | Bosshart | 364/757 |
| 4,809,212 A | 2/1989 | New et al. | 364/757 |
| 4,876,660 A | 10/1989 | Owen et al. | 364/757 |
| 4,893,268 A | 1/1990 | Denman, Jr. et al. | 364/759 |
| 5,121,431 A | 6/1992 | Wiener | 380/49 |
| 5,446,651 A | 8/1995 | Moyse et al. | 364/760 |
| 5,457,804 A | 10/1995 | Ohtomo | 395/800 |
| 5,606,677 A | 2/1997 | Balmer et al. | 395/384 |
| 5,636,351 A | 6/1997 | Lee | 395/380 |
| 5,862,067 A | 1/1999 | Mennemeier et al. | 364/748.07 |
| 5,898,604 A | 4/1999 | Winterer | 364/757 |
| 5,920,497 A * | 7/1999 | Rim | 708/620 |
| 5,943,250 A | 8/1999 | Kim et al. | 364/757 |
| 5,953,241 A | 9/1999 | Hansen et al. | 364/748.07 |

(Continued)

FOREIGN PATENT DOCUMENTS

EP 0 161 089 11/1985

(Continued)

OTHER PUBLICATIONS

Chevillat et al, "Piplined Hardware Multiplier with Extended Precision", IBM Technical DisclosureBulletin, Vo. 23, No. 9 Feb. 1981, pp. 4322-4323.*

*Primary Examiner*—Tan V. Mai
(74) *Attorney, Agent, or Firm*—Schneck & Schneck

(57) ABSTRACT

A method of operating a multiplication circuit to perform multiply-accumulate operations on multi-word operands is characterized by an operations sequencer that is programmed to direct the transfer of operand segments between RAM and internal data registers in a specified sequence. The sequence processes groups of two adjacent result word-weights (columns), with the multiply cycles within a group proceeding in a zigzag fashion by alternating columns with steadily increasing or decreasing operand segment weights. In multiplier embodiments having additional internal cache registers, these store frequently used operand segments so they aren't reloaded from memory multiple times. In this case, the sequence within a group need not proceed in a strict zigzag fashion, but can jump to a multiply operation involve at least one operand segment stored in a cache.

8 Claims, 11 Drawing Sheets

U.S. PATENT DOCUMENTS

| | | | |
|---|---|---|---|
| 5,996,066 A | 11/1999 | Yung | 712/221 |
| 6,026,421 A | 2/2000 | Sabin et al. | 708/523 |
| 6,035,316 A | 3/2000 | Peleg et al. | 708/523 |
| 6,055,554 A | 4/2000 | Schwarz | 708/503 |
| 6,202,077 B1 | 3/2001 | Smith | 708/523 |
| 6,233,597 B1 | 5/2001 | Tanoue et al. | 708/625 |
| 6,295,599 B1 | 9/2001 | Hansen et al. | 712/32 |
| 6,523,055 B1 * | 2/2003 | Yu et al. | 708/603 |

FOREIGN PATENT DOCUMENTS

EP      0 206 763      12/1986

* cited by examiner

| RAM | MUL | C_A0 | C_A1 | C_B0 | C_B1 | C_B2 |
|---|---|---|---|---|---|---|
| A0 | | | | | | |
| A1 | | A0 | | | | |
| B0 | | A0 | A1 | | | |
| B1 | | A0 | A1 | B0 | | |
| B2 | | A0 | A1 | B0 | B1 | |
| | A1*B0 | A0 | A1 | B0 | B1 | B2 |
| | A0*B0 | A0 | A1 | B0 | B1 | B2 |
| | A0*B1 | A0 | A1 | B0 | B1 | B2 |
| A3 | | A0 | A1 | B0 | B1 | B2 |
| A2 | A3*B0 | A0 | A1 | B0 | B1 | B2 |
| | A2*B0 | A0 | A1 | B0 | B1 | B2 |
| | A2*B1 | A0 | A1 | B0 | B1 | B2 |
| | A1*B1 | A0 | A1 | B0 | B1 | B2 |
| | A1*B2 | A0 | A1 | B0 | B1 | B2 |
| B3 | A0*B2 | A0 | A1 | B0 | B1 | B2 |
| | A0*B3 | A0 | A1 | B0 | B1 | B2 |
| A5 | | A0 | A1 | B0 | B1 | B2 |
| A4 | A5*B0 | A0 | A1 | B0 | B1 | B2 |
| | A4*B0 | A0 | A1 | B0 | B1 | B2 |
| A3 | A4*B1 | A0 | A1 | B0 | B1 | B2 |
| | A3*B1 | A0 | A1 | B0 | B1 | B2 |
| A2 | A3*B2 | A0 | A1 | B0 | B1 | B2 |
| B3 | A2*B2 | A0 | A1 | B0 | B1 | B2 |
| | A2*B3 | A0 | A1 | B0 | B1 | B2 |
| B4 | A1*B3 | A0 | A1 | B0 | B1 | B2 |
| | A1*B4 | A0 | A1 | B0 | B1 | B2 |
| B5 | A0*B4 | A0 | A1 | B0 | B1 | B2 |
| | A0*B5 | A0 | A1 | B0 | B1 | B2 |

Fig. 5A

| RAM | MUL | C_A0 | C_A1 | C_B0 | C_B1 | C_B2 |
|---|---|---|---|---|---|---|
| A7 |  | A0 | A1 | B0 | B1 | B2 |
| A6 | A7*B0 | A0 | A1 | B0 | B1 | B2 |
|  | A6*B0 | A0 | A1 | B0 | B1 | B2 |
| A5 | A6*B1 | A0 | A1 | B0 | B1 | B2 |
|  | A5*B1 | A0 | A1 | B0 | B1 | B2 |
| A4 | A5*B2 | A0 | A1 | B0 | B1 | B2 |
| B3 | A4*B2 | A0 | A1 | B0 | B1 | B2 |
| A3 | A4*B3 | A0 | A1 |  |  |  |
| B4 | A3*B3 | A0 | A1 |  |  |  |
| A2 | A3*B4 | A0 | A1 |  |  |  |
| B5 | A2*B4 | A0 | A1 |  |  |  |
|  | A2*B5 | A0 | A1 | B5 |  |  |
| B6 | A1*B5 | A0 | A1 | B5 |  |  |
|  | A1*B6 | A0 | A1 | B5 | B6 |  |
| B7 | A0*B6 | A0 | A1 | B5 | B6 |  |
|  | A0*B7 | A0 | A1 | B5 | B6 | B7 |
| A7 |  |  |  | B5 | B6 | B7 |
| A6 |  |  | A7 | B5 | B6 | B7 |
| B1 |  | A6 | A7 | B5 | B6 | B7 |
| B2 | A7*B1 | A6 | A7 | B5 | B6 | B7 |
|  | A7*B2 | A6 | A7 | B5 | B6 | B7 |
| B3 | A6*B2 | A6 | A7 | B5 | B6 | B7 |
| A5 | A6*B3 | A6 | A7 | B5 | B6 | B7 |
| B4 | A5*B3 | A6 | A7 | B5 | B6 | B7 |
| A4 | A5*B4 | A6 | A7 | B5 | B6 | B7 |
|  | A4*B4 | A6 | A7 | B5 | B6 | B7 |
| A3 | A4*B5 | A6 | A7 | B5 | B6 | B7 |
|  | A3*B5 | A6 | A7 | B5 | B6 | B7 |
| A2 | A3*B6 | A6 | A7 | B5 | B6 | B7 |
|  | A2*B6 | A6 | A7 | B5 | B6 | B7 |
| A1 | A2*B7 | A6 | A7 | B5 | B6 | B7 |
|  | A1*B7 | A6 | A7 | B5 | B6 | B7 |

Fig. 5B

| RAM | MUL | C_A0 | C_A1 | C_B0 | C_B1 | C_B2 |
|---|---|---|---|---|---|---|
| B3 |  | A6 | A7 | B5 | B6 | B7 |
| B4 | A7*B3 | A6 | A7 | B5 | B6 | B7 |
|  | A7*B4 | A6 | A7 | B5 | B6 | B7 |
|  | A6*B4 | A6 | A7 | B5 | B6 | B7 |
| A5 | A6*B5 | A6 | A7 | B5 | B6 | B7 |
|  | A5*B5 | A6 | A7 | B5 | B6 | B7 |
| A4 | A5*B6 | A6 | A7 | B5 | B6 | B7 |
|  | A4*B6 | A6 | A7 | B5 | B6 | B7 |
| A3 | A4*B7 | A6 | A7 | B5 | B6 | B7 |
|  | A3*B7 | A6 | A7 | B5 | B6 | B7 |
|  | A7*B5 | A6 | A7 | B5 | B6 | B7 |
|  | A7*B6 | A6 | A7 | B5 | B6 | B7 |
|  | A6*B6 | A6 | A7 | B5 | B6 | B7 |
| A5 | A6*B7 | A6 | A7 | B5 | B6 | B7 |
|  | A5*B7 | A6 | A7 | B5 | B6 | B7 |
|  | A7*B7 | A6 | A7 | B5 | B6 | B7 |

| RW1 | MUL1 | ADD | y0 | y1 | y2 | x0 | x1 | x2 | x3 |
|---|---|---|---|---|---|---|---|---|---|
| Y0 | | | | | | | | | |
| Z0 | | | Y0 | | | | | | |
| X0 | | | Y0 | | Z0 | | | | |
| Z1 | Y0X0 | Z0 | Y0 | | Z0 | X0 | | | |
| X1 | | | Y0 | | Z1 | X0 | | | |
| Y1 | Y0X1 | Z1 | Y0 | | Z1 | X0 | X1 | | |
| Z2 | Y1X0 | | Y0 | Y1 | Z1 | X0 | X1 | | |
| X2 | | | Y0 | Y1 | Z2 | X0 | X1 | | |
| R0 | Y1X1 | Z2 | Y0 | Y1 | Z2 | X0 | X1 | X2 | |
| R1 | | | Y0 | Y1 | Z2 | X0 | X1 | X2 | |
| Z3 | Y1X2 | | Y0 | Y1 | Z2 | X0 | X1 | X2 | |
| X3 | Y0X2 | | Y0 | Y1 | Z3 | X0 | X1 | X2 | |
| Y2 | Y0X3 | Z3 | Y0 | Y1 | Z3 | X0 | X1 | X2 | X3 |
| X0 | Y2X1 | | Y2 | Y1 | Z3 | X0 | X1 | X2 | X3 |
| Y3 | Y2X0 | | Y2 | Y1 | Z3 | X0 | X1 | X2 | X3 |
| Z4 | Y3X0 | | Y2 | Y3 | Z3 | X0 | X1 | X2 | X3 |
| Z5 | Y3X1 | Z4 | Y2 | Y3 | Z4 | X0 | X1 | X2 | X3 |
| R2 | Y3X2 | Z5 | Y2 | Y3 | Z5 | X0 | X1 | X2 | X3 |
| R3 | Y2X2 | | Y2 | Y3 | Z5 | X0 | X1 | X2 | X3 |
| Y1 | Y2X3 | | Y2 | Y3 | Z5 | X0 | X1 | X2 | X3 |
| X4 | Y1X3 | | Y1 | Y3 | Z5 | X0 | X1 | X2 | X3 |
| Y0 | Y1X4 | | Y1 | Y3 | Z5 | X4 | X1 | X2 | X3 |
| Y4 | Y0X4 | | Y0 | Y3 | Z5 | X4 | X1 | X2 | X3 |

Fig 7A

| RW1 | MUL1 | ADD | y0 | y1 | y2 | x0 | x1 | x2 | x3 |
|---|---|---|---|---|---|---|---|---|---|
| X0 | Y4X1 | | Y4 | Y3 | Z5 | X4 | X1 | X2 | X3 |
| Y5 | Y4X0 | | Y4 | Y3 | Z5 | X0 | X1 | X2 | X3 |
| Z6 | Y5X0 | | Y4 | Y5 | Z5 | X0 | X1 | X2 | X3 |
| Z7 | Y5X1 | Z6 | Y4 | Y5 | Z6 | X0 | X1 | X2 | X3 |
| R4 | Y5X2 | Z7 | Y4 | Y5 | Z7 | X0 | X1 | X2 | X3 |
| R5 | Y4X2 | | Y4 | Y5 | Z7 | X0 | X1 | X2 | X3 |
| Y3 | Y4X3 | | Y4 | Y5 | Z7 | X0 | X1 | X2 | X3 |
| X4 | Y3X3 | | Y3 | Y5 | Z7 | X0 | X1 | X2 | X3 |
| Y2 | Y3X4 | | Y3 | Y5 | Z7 | X4 | X1 | X2 | X3 |
| Y6 | Y2X4 | | Y2 | Y5 | Z7 | X4 | X1 | X2 | X3 |
| X0 | Y6X1 | | Y6 | Y5 | Z7 | X4 | X1 | X2 | X3 |
| Y7 | Y6X0 | | Y6 | Y5 | Z7 | X0 | X1 | X2 | X3 |
| Z8 | Y7X0 | | Y6 | Y7 | Z7 | X0 | X1 | X2 | X3 |
| | Y11X1 | Z12 | Y10 | Y11 | Z12 | X0 | X1 | X2 | X3 |
| | Y11X2 | Z13 | Y10 | Y11 | Z13 | X0 | X1 | X2 | X3 |
| | Y10X2 | | Y10 | Y11 | Z13 | X0 | X1 | X2 | X3 |
| Y4 | Y10X3 | | Y10 | Y11 | Z13 | X0 | X1 | X2 | X3 |
| X11 | Y9X3 | | Y10 | Y9 | Z13 | X0 | X1 | X2 | X3 |
| Y3 | Y9X4 | | Y10 | Y9 | Z13 | X4 | X1 | X2 | X3 |
| Y14 | Y8X4 | | Y10 | Y8 | Z13 | X4 | X1 | X2 | X3 |
| X0 | Y12X1 | | Y10 | Y12 | Z13 | X4 | X1 | X2 | X3 |
| Y15 | Y12X0 | | Y10 | Y12 | Z13 | X0 | X1 | X2 | X3 |
| Z14 | Y13X0 | | Y10 | Y12 | Z13 | X0 | X1 | X2 | X3 |

Fig.7B

| RW1 | MUL1 | ADD | y0 | y1 | y2 | x0 | x1 | x2 | x3 |
|---|---|---|---|---|---|---|---|---|---|
| Z15 | Y13X1 | Z14 | Y10 | Y12 | Y13 | Z14 | X1 | X2 | X3 |
| R12 | Y13X2 | Z15 | Y10 | Y12 | Y13 | Z15 | X1 | X2 | X3 |
| R13 | Y12X2 |  | Y10 | Y12 | Y13 | Z15 | X1 | X2 | X3 |
| X4 | Y12X3 |  | Y10 | Y12 | Y13 | Z15 | X1 | X2 | X3 |
| Y11 | Y10X4 |  | Y10 | Y12 | Y13 | Z15 | X4 | X2 | X3 |
| Z16 | Y11X4 |  | Y11 | Y12 | Y13 | Z15 | X4 | X2 | X3 |
|  | Y11X3 |  | Y11 | Y12 | Y13 | Z16 | X4 | X2 | X3 |
| Z17 | Y13X3 | Z16 | Y11 | Y12 | Y13 | Z16 | X4 | X2 | X3 |
| Z18 | Y13X4 | Z17 | Y11 | Y12 | Y13 | Z17 | X4 | X2 | X3 |
| R14 | Y12X4 |  | Y11 | Y12 | Y13 | Z18 | X4 | X2 | R15 |
| R15 |  |  | Y11 | Y12 | Y13 | Z18 | X4 | X2 | R15 |
|  |  | Z18 | Y11 | Y12 | Y13 | Z18 | X4 | X2 | R15 |
| R16 |  |  | Y11 | Y12 | Y13 | Z18 | X4 | X2 | R15 |
| R17 |  |  | Y11 | Y12 | Y13 | Z18 | X4 | X2 | R15 |
| R18 |  |  | Y11 | Y12 | Y13 | Z18 | X4 | X2 | R15 |

Fig.7C

EFFICIENT MULTIPLICATION SEQUENCE FOR LARGE INTEGER OPERANDS WIDER THAN THE MULTIPLIER HARDWARE

TECHNICAL FIELD

The present invention relates to arithmetic processing circuitry, specifically multiplier hardware, and methods of operating the same to carry out multiply or multiply-accumulate operations (and related squaring operations) involving at least one multi-word operand that is wider than the multiplier hardware.

The invention relates in particular to hardware control of the multiplication sequence for executing such multi-word operations in an efficient manner, where the method is characterized by the particular order in which the words of the operands are handled.

BACKGROUND ART

Multiplication hardware necessarily has a finite size, typically defined as having a pair of single-word operand inputs and a two-word result output. In order to also carry out multiply-accumulate operations, the multiplier output is normally connected to an accumulator circuit, which is at least two-words plus one-bit wide. (The supplemental bit can be part of the result or simply be present as CARRY information indicating either an overflow in the case of addition or an underflow in the case of subtraction in the accumulate part of the operation.) The basic operation is thus $R = Z \pm XY$. For simple multiplication, $R = XY$, the accumulator input $Z = 0$. For squaring operations, $X = Y$. The basic operation is usually designed to perform standard integer arithmetic, but multiplication hardware that performs polynomial arithmetic also exists, especially for use in cryptographic applications.

In cryptography and a number of other applications, there is need to multiply very big integers comprising a large number of words. In order to perform these operations using operands that are much wider than the multiplication hardware, the operands must be sliced into a plurality of single-word segments and fed into the hardware in some specified sequence. These segments are operated upon and the intermediate results are accumulated such that the final product is computed as a sum of cross-products of various weights. The word-wide operand segments as well as the partial results, are stored in a memory that is addressed by the multiplier hardware's operations sequencer.

A typical sequence keeps a first operand's segment constant while the other operand's segments are scanned one word at a time into the multiplier; then the first operand increments to the next word-wide segment and the scan of the second operand is repeated. If $X = \Sigma_i x_i w^i$, $Y = \Sigma_j y_j w^j$, and $Z = \Sigma_k z_k w^k$, with $w = 2^n$, then $R = \Sigma_k r_k w^k = Z \pm XY = \Sigma_k z_k w^k \pm \Sigma_j (x_i y_j) w^{i+j}$, where $i+j=k$, and where $n$ is the word size in bits. Thus, in a typical operations sequence, the words $y_j$ are cycled over all $j$ for a fixed word $x_i$, then $i$ is incremented by one and the cycle of words $y_j$ is repeated for the new $x_i$.

While the above described sequence is straightforward, easy to program, and obtains the correct result, each step or cycle requires an average of three accesses of the random-access memory. In particular, each step requires that $y_j$ and $z_k$ be read from memory, and a partial result $r_k$ be written back to memory.

An object of the invention is to provide a more efficient multi-word multiplication sequence for large integer operations, that requires an average of only one memory access per multiplication.

DISCLOSURE OF INVENTION

The object is achieved by a method that processes the multiply sequence in groups of two adjacent result word-weights (referred to as columns). Within a group of column pairs, the sequence proceeds by alternating columns with steadily increasing (or steadily decreasing) operand segment weights (referred to as a zigzag pattern), so that one of the segments from a preceding multiply cycle is also used in the present multiply cycle, and, except possibly for the first multiply cycle in a given group, only one of the operand segments needs to be read from memory in any multiply cycle for that group. Additions of partial products of the same results weight are performed in an accumulate operation that is pipelined with the multiply operation. Two-word segments of a separate accumulate parameter may also be added at the beginning or end of a sequence of accumulate operations of the corresponding group.

A multiply-accumulate (MAC) unit performs the multiply and accumulate cycles as directed by a firmware-preprogrammed operations sequencer in the multiplication hardware, with reads of operand segments from random-access memory (RAM) being transferred to the MAC unit through registers internal to the multiplication hardware. Likewise, writes of intermediate and final results are conducted back into the internal register for accumulate parameter segment and ultimately back into the RAM.

A further improvement adds internal cache registers for holding frequently used parameter segments that recur at the beginning or end of each group of multiply cycles.

The invention has an advantage over prior multiply sequences in largely matching the multiplier's requirements for parameter segments to the memory access bandwidth of one read and one write per multiply cycle, so that an overall multiplication of large multi-word integers is performed efficiently in a minimum of cycles. The multiplication operation can also be spread over several cycles (using pipelining), in which case it is still considered that, on average, one multiplication is performed per cycle, since one multiplication result is available per cycle and since one new multiplication operation can be started per cycle.

BRIEF DESCRIPTION OF THE DRAWINGS

FIGS. 5a, 5b and 5c are a table showing an operation sequence for one multiplication embodiment of the present invention, using an additional set of 5 cache registers storing frequently used operand segments.

Figure 6:
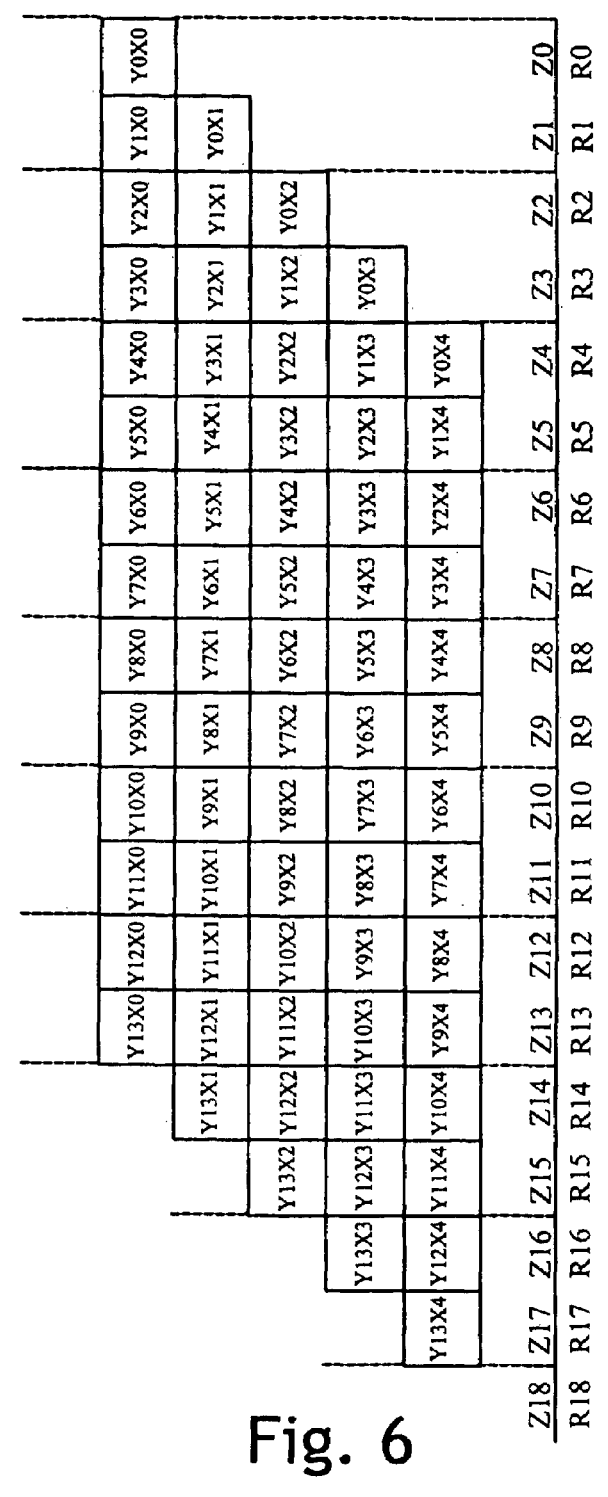

FIG. 6 is a chart of plural word-by-word multiplications and additions laid out as in FIG. 4 by operand and result weights for an exemplary "rectangular" multiply-accumulate operation with different size operands.

FIGS. 7a, 7b and 7c are a table showing another example of an operation sequence corresponding to the examples of FIG. 6, in this case with a set of 7 cache registers in the hardware.

BEST MODE OF CARRYING OUT THE INVENTION

Figure 1:
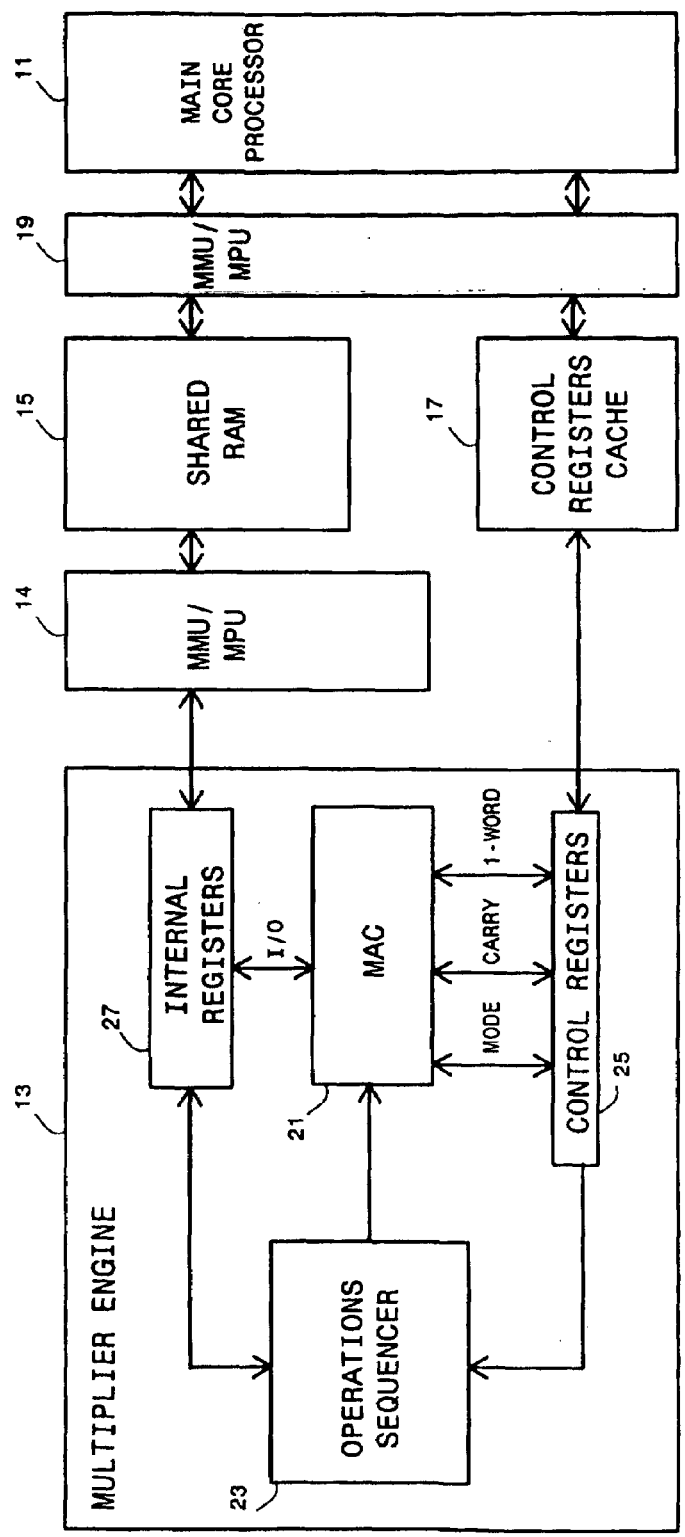
FIG. 1 is a schematic plan view of the main architecture of a processing system that includes a multiplier engine of the present invention.

With reference to FIG. 1, the main architecture of a processing system is seen to include a main core processor 11 and a multiplier engine 13 sharing a random-access memory or RAM 15 and a multiplier control registers cache 17. The multiplier engine 13 includes a multiply-accumulate (MAC) unit 21, an operations sequencer 23 connected to send command signals to the MAC 21, control registers 25 and internal data registers 27.

Memory management/memory protection units (MMU/MPU) 14 and 19 interface the RAM 15 and cache 17 with the processor 11 and multiplier engine 13. In our preferred implementation, there is an MMU/MPU for the processor core 11 concerning both RAM and peripheral accesses (in order to control/limit the accesses to certain zones/peripherals). Here, the multiplier engine 13 is considered a peripheral. Because the multiplier engine 13 has direct access to RAM 15, it could be a way for a user to overcome access limitations specified in the core-side MMU/MPU 19. Therefore, we provide another MMU/MPU 14 to control memory accesses by multiplier engine 13. The two MMU/MPU units 14 and 19 should be configured in a consistent way, but there is no link between them and their operation is independent.

The multiplier engine 13 typically does not have any dedicated ROM, but is configured and parameterized by the processor core 11. The control registers 25 are connected to the control registers cache 17 from which it receives commands from the processor core 11. The control registers 25 transmit command parameters and status information to the operations sequencer 23, and also interact with the MAC unit 21, e.g. to select the MAC mode (standard arithmetic or polynomial arithmetic) for those MAC units that may be capable of both types of arithmetic, to select single-word or multi-word MAC operation, and to communicate any carry values from a current or previous MAC operation.

The internal data and address registers 27 are connected to the shared RAM 15 to receive and transmit operand parameters of a MAC operation. The operations sequencer 23 is preferably pre-programmed with firmware according to the invention described herein. The operations sequencer 23 sends commands and addresses to the internal registers 27 and thence to the shared RAM 15 to direct the loading of selected word-wide operand segments in a specified order according to the present invention. The architecture is typically constructed so that, when the multiplier engine 13 is running, it has privileged access to a specific part of the shared RAM 15. This permits the core 11 to still access other parts of the RAM 15 during a computation. Alternatively, access to the shared RAM 15 could be entirely dedicated to the multiplier engine 13 during a computation and accessible to the processor core 11 only when the multiplier 13 is not using it.

The MAC unit 21 may be based on a 32-bit word size. In this case, operand lengths are always a multiples of 4 bytes and operands are aligned on 32-bit word boundaries with leading zeros when necessary. This choice facilitates address computations for the shared RAM 15 since the processor 11 typically works on byte addresses. The MAC unit 21 would have a pair of 32-bit (word-wide) operand inputs X and Y for the multiplier array, a two-word wide accumulator input Z, a two-word wide multiplier results output that forms a second accumulator input, and a two-word wide accumulator output R.

Although the MAC unit 21 only operates on single-word operand inputs X and Y, the overall multiplier engine 13, including the programmed operations sequencer 23, can be considered as a large (multi-word) integer multiplier. It supports efficient multiply operations such as multiply-accumulate of N-word numbers, square-accumulate of N-word numbers (multiplier input Y=X), multiply or square of N-word numbers without accumulate (accumulator input Z=0), and multiply-accumulate of an N-word number by a 1-word (or even 1-byte) constant A.

Figure 2:
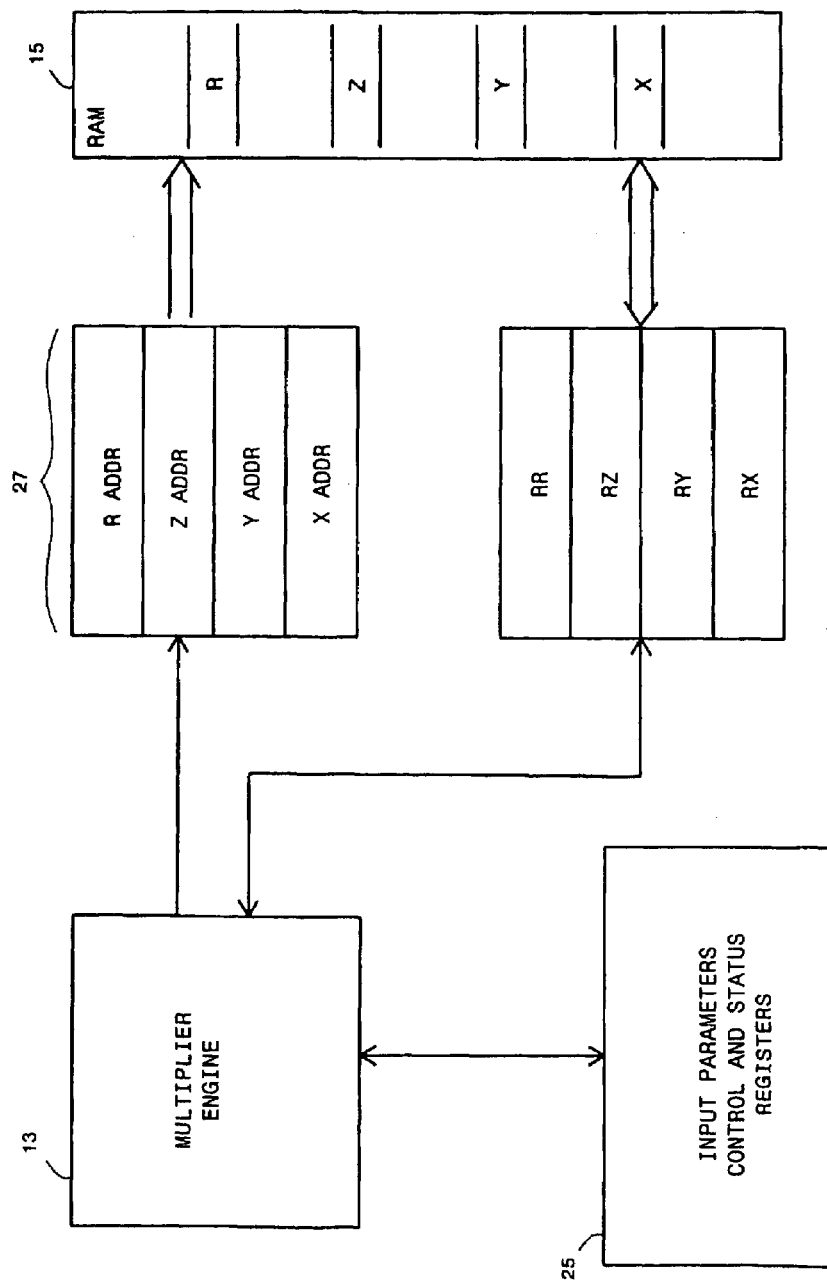
FIG. 2 is an interface diagram showing the registers and memory interface for a typical multiplier engine in accord with the present invention.

With reference to FIG. 2, the interaction between the multiplier engine 13 with its various registers and caches and with the shared RAM 15 is illustrated by an interface diagram. The RAM 15 stores the parameters X, Y, Z and R at specific address blocks that must be pointed to in order to access them. The words of the operands are always stored least significant bit first in the RAM, beginning with a base address. In order to request a parameter, or a specific operand segment word, the corresponding address register X ADDR, Y ADDR, Z ADDR or R ADDR (some of the internal registers 27 in FIG. 1) must be loaded with the related address. The addressed words are then loaded to or from the corresponding data register RX, RY, RZ or RR (more of the internal registers 27 in FIG. 1 used by the MAC unit 21).

Registers 25 typically include one or more operations registers for specifying a desired operation to be performed (multiply, multiply-accumulate, multiply-subtract, multiply by one-word constant, squaring, etc.), one or more control registers specifying various options (natural or polynomial mode, full or truncated operation, carry or carry input, etc.) as well as indicating operand lengths, and one or more status registers indicating various conditions (busy/idle, an overflow/underflow/zero result, error conditions, etc.)

Figure 3:
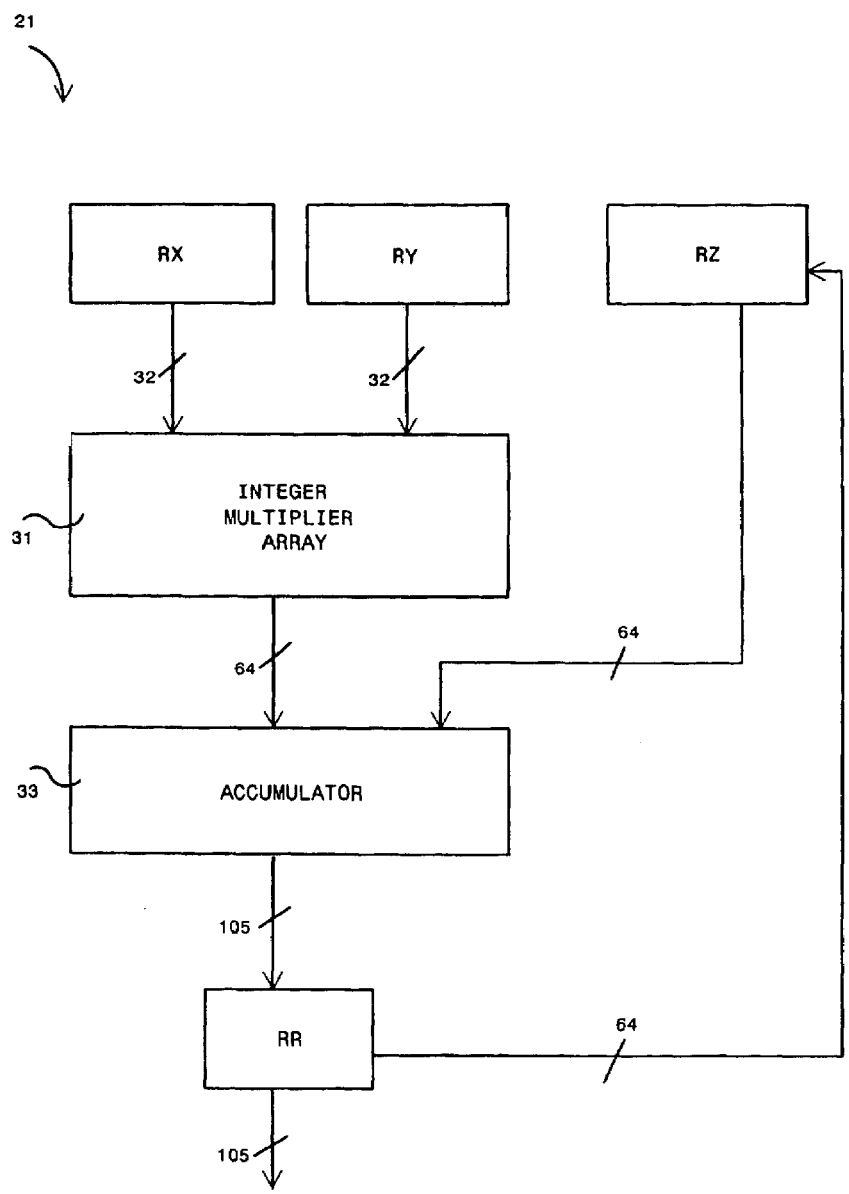
FIG. 3 is a more detailed schematic plan view of a MAC unit in the multiplier engine of FIG. 1.

With reference to FIG. 3, the MAC unit 21 of FIG. 1 is made up of an integer multiplier array 31 receiving single-word operands or more usually single-word segments of larger multi-word operands via data registers RX and RY loaded from the shared RAM. The multiplier array 31 outputs a two-word result of multiplying the input words to an accumulator 33. The accumulator 33 has a size of three words (=96 bits) plus a number of carry bits sufficient to handle a specified maximum operand size. For example, for 512 word operands the longest column has 512 rows of intermediate products to be added, thereby requiring a 9-bit space for the carry sum. This gives a total accumulator width of 105 bits for this instance. The accumulator 33 also receives a two-word input parameter from data register RZ, and outputs a result to a results data register RR. Two-word feedback may be provided from the accumulator output or data register RR back to the accumulate operand register RZ to permit the accumulate operand segment to be updated before the final result in register RR is written back to the RAM. A typical size for the multiply-accumulate (MAC) unit handles 32-bit words, with 32-bit operand inputs from the registers RX and RY to the multiplier array, and with 64-bit operand multiplier array output, and accumulator inputs and output to and from registers RZ and RR.

Letting A represent a single-word operand or a segment of multi-word operand X that is loaded into the multiplier array 31 from the data register RX, and letting B represent a single-word segment of multi-word operand Y that is loaded into the multiplier array 31 from the data register RY, then $A=\Sigma_i a_i 2^i$, $B=\Sigma_j b_j 2^j$, where $a_i$ and $b_j$ are the individual bits of the operand or segment, and where i and j range from 0 to 31.

For multiplication over the integer field $Z_p$, $$AB = \Sigma_i \Sigma_j a_i b_j 2^{i+j}.$$

For multiplication over the Galois field $GF(2^n)$, addition of two bits is reduced modulo 2 so that $$AB = \Sigma_{k=0}^{2n-2}(2^k \cdot \Sigma_{i+j=k}(a_i \cdot b_j \bmod 2))$$

There may also be a carry-in term W which is added. The handling of the carry depends on the options indicated by the registers 25 mentioned above. Note also that the carry-in term W need not have a direct relationship to the outgoing carry term from an immediately prior computation. Finally, Galois field operation has an influence over carry processing in that the adding of the carry-in term W to the least significant bit is also conducted modulo 2.

Full-scaled multiplication of multi-word operands X and Y involves a sequence of the single-word multiplications just described. X and Y are respectively N-word and M-word numbers. The general operation is R=[Z]±((X·Y)+W). This can be written in sum-of-products form as:

$$R = [\Sigma_{k=0}^{N+M-1} Z_k b^k] \pm (\Sigma_{i=0}^{N-1}(\Sigma_{j=0}^{M-1}(X_i Y_j b^{i+j})) + W).$$

This formula is valid for both $Z_p$ and $GF(2^n)$ operations, and $b=2^{32}$. The three-word-plus-carries accumulator is able to compute $Acc:=Acc\pm(X_i \cdot Y_j)$ or $Acc:=Acc\pm(X_i \cdot Y_j \cdot 2^{32})$, as needed. The invention resides in the particular order in which the single-word multiplies occur.

The Operation Sequence

Figure 4:
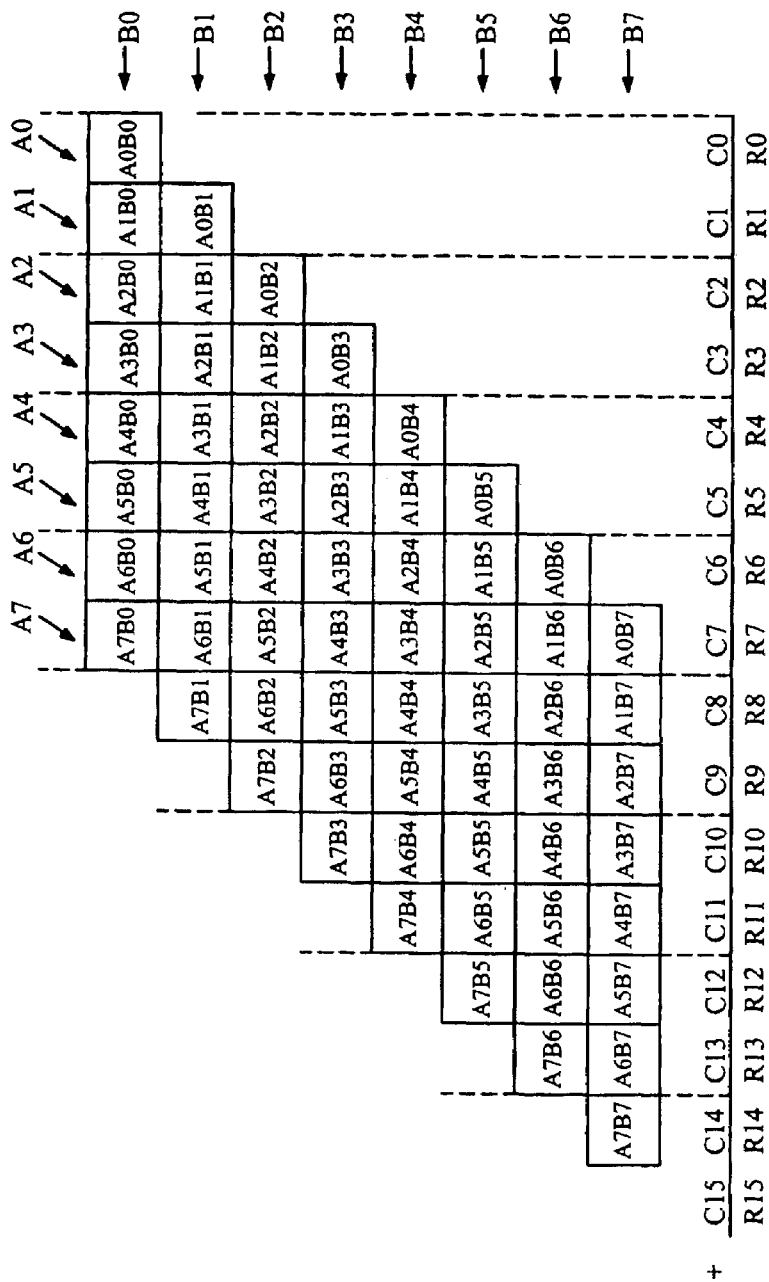
FIG. 4 is a chart of plural word-by-word multiplications and additions laid out by operand and result weights for use in illustrating the operation sequence according the present invention.

With reference to FIG. 4, the chart shows a layout of word-by-word multiplication operations of first operand segments A0 . . . A7 of multi-word operand X with the second operand segments B0 . . . B7 of multi-word operand Y. For illustration purposes, both operands X and Y are 8-words wide, but this need not be the case. To obtain the result words R0 . . . R15, the various partial products need eventually to be added vertically together with the corresponding accumulate words C0 . . . C15 of operand Z. In order to memory accesses, the loading of the operand segments, their respective multiplying, and the adding to the accumulate segments, are organized in double columns of adjacent result weights. Each group of two columns is processed starting from either the top or the bottom and progressing line by line in a zigzag fashion. Also, adjacent groups of column pairs need not necessarily progress the same direction. Thus, in FIG. 4, the multiplication sequence could go as: A1B0, A0B0, A0B1; A0B3, A0B2, A1B2, A1B1, A2B1, A2B0, A3B0; A5B0, A4B0, A4B1, A3B1, A3B2, A2B2, A2B3, A1B3, A1B4, A0B4, A0B5; A0B7, A0B6, A1B6, A1B5, A2B5, A2B4, A3B4, A3B3, A4B3, A4B2, A5B2, A5B1, A6B1, A6B0, A7B0; A7B1, A7B2, A6B2, A6B3, A5B3, A5B4, A4B4, A4B5, A3B5, A3B6, A2B6, A2B7, A1B7; A3B7, A4B7, A4B6, A5B6, A5B5, A6B5, A6B4, A7B4, A7B3; A7B5, A7B6, A6B6, A6B7, A5B7; A7B7. (Semicolons separate the different groups of column pairs in the sequence list.) In this particular example, successive groups progress in opposite directions (top to bottom, then bottom to top, then top to bottom again, etc.) Note that only one operand needs to be read before the array can perform the next multiply, since one operand is already in place from the previous multiply.

If successive groups of column pairs always progress in the same direction, then a number of cache registers can be provided to store certain frequently used operand segments needed to avoid two reads before the first several multiplies at the beginning of each group. In this case, five caches will store A0, A1, B0, B1 and B2 during the ascending half of the multiplication sequence (the right half of FIG. 4, when each successive group becomes longer). The caches then will store A6, A7, B5, B6 and B7 during the descending half of the sequence (the left half of FIG. 4, when each successive group becomes shorter).

FIGS. 5*a*, 5*b* and 5*c* illustrates the benefit of having such caches, by showing a multiply sequence for this embodiment of the invention. The first column represents RAM read accesses, the second column represents multiplier array operations, and the five right-most columns show the contents of the five caches during each multiply cycle. For an 8 word by 8 word multiply with 5 caches, there are 64 multiply cycles, 7 cache load-only cycles, 5 other memory read cycles, plus 3 cycles at the end for trailing adds for at total of only 79 cycles. The advantage over prior sequences is even more apparent when multiplying larger integers common in cryptographic applications (e.g. 1024 words by 1024 bits).

The word size of each operand can be either even or odd, and need not be the same for both operands. The latter case is often referred to as a "rectangular multiply" operation. An example of a rectangular multiply and accumulate operation where one of the multiply operands X has an odd number of words (5) and the other multiply operands Y has an even number of words (14), and where the accumulate operand Z and the result R have an odd number of words (19) is shown in FIGS. 6, 7*a*, 7*b* and 7*c* by way of example. In this example, there are also 7 internal cache registers for storing frequently used parameter segments. Only a portion of the total sequence is shown, for groups R0-R1, R2-R3, R4-R5, R6-R7, . . . (R8 through R11 omitted), R12-R13, R14-R15, and R16-R17. Within the groups, the multiply pattern again is arranged so that at most one RAM read access and one RAM write access is required. The first column shows the specific RAM address that is applied and accessed in successive cycles. The writes to RAM are shown with bold borders. The second and third columns show the operations being executed by the multiplier array and accumulator, respectively. The seven right-most columns show the contents of the internal cache registers used by the multiplier array and accumulator.

This example also shows that the multiply sequence need not be strictly zigzag descending from top to bottom or zigzag ascending from bottom to top over an entire group of column pairs. Rather, the beginnings and/or ends of such a zigzag sequence can be displaced and even proceed in an opposite direction from the first part of a group sequence, because the needed parameters are available in the caches. Thus, in the first group R0-R1, the order can be Y0X0, Y0X1, Y1X0, instead of Y0X0, Y1X0, Y0X1 for a strictly descending sequence, or instead of Y0X1, Y0X0, Y1X0 for a strictly ascending sequence. In the second, third and fourth groups the sequence begins in the middle at Y1X1, Y3X1, and Y5X1 respectively, descends in zigzag fashion to the bottom, then jumps back up to Y2X1, Y4X1, and Y6X1 respectively and finishes in ascending zigzag fashion to the top. This can be done because operand segment X1 is stored in an internal cache, so still only one read is needed despite the jump from Y0X3 to Y2X1, from Y0X4 to Y4X1, and from Y2X4 to Y6X1 respectively in the middle of the sequence. The same goes for any of the groups omitted in FIGS. 7*a*-7*c* and for group R12-R13. In the group R14-R15, the sequence begins at the top and descends in strictly zigzag fashion until Y12X3, but then jumps to Y10X4 and finishes in ascending zigzag fashion with Y11X4 and Y11X3. This jump and change of direction in the sequence is permitted because the parameter X4 is already available in a cache register. The final multiply group R16-R17 is shown in a strictly descending zigzag pattern, but can proceed in any order because operand segments X3 and X4 are available in cache registers.

Squaring operations and square-accumulate operations proceed in the same manner as any of the preceding examples, except that the X and Y operands are identical. However, because the specific segments of X and Y are not usually the same in any particular multiply cycle, the square operations can be treated just like any other multiply operation in which the operands X and Y differ.

What is claimed is:

1. A method of operating a multiplication circuit in a cryptographic application to compute, with fewer memory accesses, the product of two operands (X and Y) at least one of which is substantially wider than the multiplication circuit, the multiplication circuit having a pair of word-wide operand inputs and a two-word-wide product output, where a word is a specified number of bits, each of the operands composed of a plurality of contiguous ordered word-wide operand segments ($x_k$ and $y_m$) characterized by specific weights (k and m), the multiplication circuit having access to a memory, the method comprising the steps of:

loading word-wide operand segments of the two operands in a specified order from the memory into the multiplication circuit, the multiplication circuit including at least two registers (RX and RY) having access to said memory for temporarily holding the loaded segments;

multiplying the loaded segments to obtain two-word-wide intermediate products, the intermediate products having a weight equal to the sum of weights of the loaded segments;

adding intermediate products of the same weight in an accumulator, the accumulator having a size of three words plus a number of carry bits sufficient for handling a specified maximum operand size, the accumulator connected to a two-word input register (RZ) for temporarily holding any previously added products of a specified weight and a two-word output register (RR) for holding results of an addition step, said registers (RZ and RR) having access to said memory; and storing accumulated results from said output register (RR) back into said memory at least after accumulating all intermediate products of the specified weight;

wherein the specified order for loading operand segments into said registers is a sequence defined by the resulting intermediate product weights, wherein the multiplying step is done in successive groups of two adjacent product weights, with the sequence within a group being selected such that, other than a first multiply operation in a given group, at most one of the operand segments need be read from memory into one register (RX or RY), the other operand segment already being stored in the other register (RY or RX) from the immediately preceding multiply operation.

2. The method of claim 1, wherein the accumulator input register (RZ) is loaded with a segment of an accumulate word (Z), where the segment is of the same weight as the intermediate products to be formed in said multiply step, whereby the method of operating executes a multiply-accumulate operation on a pair of multiply operands and an accumulate operand.

3. The method of claim 1, wherein the sequence proceeds within a group in a zigzag pattern of steadily increasing operand segment weights.

4. The method of claim 1, wherein the sequence proceeds within a group in a zigzag pattern of steadily decreasing operand segment weights.

5. The method of claim 1, wherein the multiplication circuit further contains a set of internal cache registers, said cache registers being loaded from memory with operand segments that are frequently used in a multiply operation.

6. The method of claim 5, wherein the sequence proceeds within a group beginning with a multiply operation with at least one operand segment stored in a cache register in a first zigzag direction of steadily increasing or decreasing operand segment weights, then jumps to a multiply operation of the group not yet performed that also has at least one operand segment stored in a cache register and proceeds in a second zigzag direction of steadily decreasing or increasing operand segment weights until all multiply operations for that group are completed.

7. The method of claim 1 wherein the specified order is preprogrammed in firmware within an operations sequencer of the multiplication circuit, with operand word lengths being included as an input parameter for a multiply command.

8. A multiplication circuit for use in cryptographic application, comprising:

a multiply-accumulate (MAC) unit including a multiplier array with inputs receiving single-word operand segments to be multiplied to form a two-word intermediate product, and also including an accumulator circuit with a first two-word input for receiving intermediate products from the multiplier, a second two-word input for receiving an accumulate value, and an output of three words plus a number of carry bits sufficient for handling a specified maximum operand size for providing a sum of input values from the two-word inputs, the accumulator output also feeding two words back to the second two-word input;

a set of internal address registers for addressing a random-access memory;

a set of internal data registers (RX, RY, RZ, RR) connected to receive and transmit segments of said operands from and to said memory and also connected to said multiplier array and to said accumulator so as to supply operand segments to the inputs thereof and receive outputs therefrom, each of said operand segments having a specified weight; and an operations sequencer for controlling the accessing of memory by said internal address and data registers and controlling the sequence of multiply and accumulate operations by said respective multiplier array and accumulator, wherein said sequence is defined by the resulting product weights equal to the sum of the operand segment weights being multiplied, wherein the multiply operations are done in successive groups of two adjacent product weights, with the sequence within a group being selected such that, other than a first multiply operation in a given group, at most one of the operand segments need be read from memory into one register (RX or RY), the other operand segment already being stored in the other register (RY or RX) from the immediately preceding multiply operation.

* * * * *